United States Patent
Mundra et al.

(10) Patent No.: US 10,968,338 B2
(45) Date of Patent: Apr. 6, 2021

(54) FLAME RETARDANT POLYMERIC COMPOSITION

(71) Applicant: Dow Global Technologies LLC, Midland, MI (US)

(72) Inventors: Manish Mundra, Collegeville, PA (US); Bharat I. Chaudhary, Collegeville, PA (US); Abhijit Ghosh-Dastidar, Collegeville, PA (US); Peter C. Dreux, Collegeville, PA (US)

(73) Assignee: Dow Global Technologies LLC, Midland, MI (US)

( * ) Notice: Subject to any disclaimer, the term of this patent is extended or adjusted under 35 U.S.C. 154(b) by 83 days.

(21) Appl. No.: 16/330,165

(22) PCT Filed: Sep. 8, 2017

(86) PCT No.: PCT/US2017/050615
§ 371 (c)(1),
(2) Date: Mar. 4, 2019

(87) PCT Pub. No.: WO2018/049117
PCT Pub. Date: Mar. 15, 2018

(65) Prior Publication Data
US 2019/0185654 A1 Jun. 20, 2019

Related U.S. Application Data

(60) Provisional application No. 62/384,907, filed on Sep. 8, 2016.

(51) Int. Cl.
| | | |
|---|---|---|
| *C08L 23/26* | (2006.01) | |
| *H01B 7/295* | (2006.01) | |
| *C09K 21/02* | (2006.01) | |
| *C09K 21/08* | (2006.01) | |
| *C08K 3/22* | (2006.01) | |
| *C08K 5/00* | (2006.01) | |
| *C08K 5/06* | (2006.01) | |
| *C08K 5/23* | (2006.01) | |
| *C08L 23/08* | (2006.01) | |
| *C08L 25/18* | (2006.01) | |
| *C08L 33/16* | (2006.01) | |
| *C08K 5/3417* | (2006.01) | |

(52) U.S. Cl.
CPC ............ *C08L 23/26* (2013.01); *C08K 3/2279* (2013.01); *C08K 5/0066* (2013.01); *C08K 5/06* (2013.01); *C08K 5/3417* (2013.01); *C08L 23/0869* (2013.01); *C08L 25/18* (2013.01); *C08L 33/16* (2013.01); *C09K 21/02* (2013.01); *C09K 21/08* (2013.01); *H01B 7/295* (2013.01); *C08L 2201/02* (2013.01)

(58) Field of Classification Search
CPC ...... C08L 23/26; C08L 23/0869; C08L 25/18; C08L 33/16; C08L 2201/02; H01B 7/295; C09K 21/02; C09K 21/08; C09K 3/2279; C09K 5/0066; C09K 5/06; C09K 5/3417
USPC .......................................................... 524/469
See application file for complete search history.

(56) References Cited

U.S. PATENT DOCUMENTS

| | | |
|---|---|---|
| 3,225,018 A | 12/1965 | Zutty |
| 3,898,194 A | 8/1975 | Sanroma |
| 3,971,752 A | 7/1976 | Aoyama et al. |
| 4,574,133 A | 3/1986 | Umpleby |
| 5,066,752 A | 11/1991 | Favstritsky et al. |
| 5,246,783 A | 9/1993 | Spenadel et al. |
| 5,401,787 A | 3/1995 | Tonyali |
| 6,048,935 A | 4/2000 | Penfold et al. |
| 6,096,818 A | 8/2000 | Nakaura et al. |
| 6,197,864 B1 * | 3/2001 | Borke ............... C08K 3/22 524/373 |
| 6,331,597 B1 | 12/2001 | Drumright |
| 6,496,629 B2 | 12/2002 | Ma et al. |
| 6,714,707 B2 | 3/2004 | Rossi et al. |
| 2005/0049343 A1 | 3/2005 | Borke et al. |
| 2013/0079448 A1 | 3/2013 | Biscoglio |
| 2013/0273367 A1 * | 10/2013 | Shimada .............. C08K 3/016 428/389 |
| 2015/0267034 A1 * | 9/2015 | Biscoglio ............ C08K 3/2279 524/81 |

FOREIGN PATENT DOCUMENTS

| | | |
|---|---|---|
| EP | 0700962 A1 | 3/1996 |
| WO | 2014/014648 A2 | 1/2014 |

* cited by examiner

Primary Examiner — Michael Bernshteyn

(57) ABSTRACT

The present disclosure provides a composition. The composition includes a silanol functionalized polyolefin; an anhydride-free brominated flame retardant; antimony trioxide; and the composition has an antimony (Sb) to bromine (Br) molar ratio (Sb:Br molar ratio) from 0.37 to 1.05. The present disclosure also provides a coated conductor. The coated conductor includes a conductor and a coating on the conductor, the coating including a composition. The composition includes a silanol functionalized polyolefin; an anhydride-free brominated flame retardant; antimony trioxide; and the composition has an antimony (Sb) to bromine (Br) molar ratio (Sb:Br molar ratio) from 0.37 to 1.05.

15 Claims, No Drawings

FLAME RETARDANT POLYMERIC COMPOSITION

FIELD

The present disclosure relates to a composition suitable for wire and cable applications, and halogenated flame retardant compositions in particular.

BACKGROUND

Known are halogenated flame retardant compositions, such as those containing brominated flame retardants in combination with antimony trioxide, for applications such as wire and cable. Halogenated flame retardant compositions can be formulated to provide sufficient flame retardancy, but they typically require high loadings of flame retardants. High loadings of flame retardants adversely affect the processability and mechanical performance, such as elongation and impact strength, of the compositions.

A need exists for a flame retardant composition that contains a low amount of flame retardant.

A further need exists for a flame retardant composition that meets the VW-1 burn rating and/or passes the horizontal burn test.

SUMMARY

The present disclosure provides a composition, and further a halogenated flame retardant composition, that is suitable for wire and cable applications. The composition includes a silanol functionalized polyolefin; an anhydride-free brominated flame retardant; antimony trioxide; and the composition has an antimony (Sb) to bromine (Br) molar ratio (Sb:Br molar ratio) from 0.37 to 1.05.

The present composition also provides a coated conductor. The coated conductor includes a conductor and a coating on the conductor, the coating including a composition. The composition contains a silanol functionalized polyolefin; an anhydride-free brominated flame retardant; and antimony trioxide, and the composition has an antimony (Sb) to bromine (Br) molar ratio (Sb:Br molar ratio) from 0.37 to 1.05.

DEFINITIONS

Any reference to the Periodic Table of Elements is that as published by CRC Press, Inc., 1990-1991. Reference to a group of elements in this table is by the new notation for numbering groups.

For purposes of United States patent practice, the contents of any referenced patent, patent application or publication are incorporated by reference in their entirety (or its equivalent US version is so incorporated by reference) especially with respect to the disclosure of definitions (to the extent not inconsistent with any definitions specifically provided in this disclosure) and general knowledge in the art.

The numerical ranges disclosed herein include all values from, and including, the lower and upper value. For ranges containing explicit values (e.g., 1 or 2; or 3 to 5; or 6; or 7), any subrange between any two explicit values is included (e.g., 1 to 2; 2 to 6; 5 to 7; 3 to 7; 5 to 6; etc.).

Unless stated to the contrary, implicit from the context, or customary in the art, all parts and percents are based on weight and all test methods are current as of the filing date of this disclosure.

A "cable" is at least one conductor, e.g., wire, optical fiber, etc., within a protective jacket or sheath. Typically, a cable is two or more wires or two or more optical fibers bound together in a common protective jacket or sheath. Combination cables may contain both electrical wires and optical fibers. The individual wires or fibers inside the jacket or sheath may be bare, covered or insulated. Typical cable designs are illustrated in U.S. Pat. Nos. 5,246,783; 6,496,629; and 6,714,707.

The term "composition" refers to a mixture of materials which comprise the composition, as well as reaction products and decomposition products formed from the materials of the composition.

The terms "comprising," "including," "having" and their derivatives, are not intended to exclude the presence of any additional component, step or procedure, whether or not the same is specifically disclosed. In order to avoid any doubt, all compositions claimed through use of the term "comprising" may include any additional additive, adjuvant, or compound, whether polymeric or otherwise, unless stated to the contrary. In contrast, the term "consisting essentially of" excludes from the scope of any succeeding recitation any other component, step, or procedure, excepting those that are not essential to operability. The term "consisting of" excludes any component, step, or procedure not specifically delineated or listed. The term "or," unless stated otherwise, refers to the listed members individually as well as in any combination. Use of the singular includes use of the plural and vice versa.

A "conductor" is an element of elongated shape (wire, cable, optical fiber) for transferring energy at any voltage (DC, AC, or transient). The conductor is typically at least one metal wire or at least one metal cable (such as aluminum or copper), but may be optical fiber. The conductor may be a single cable or a plurality of cables bound together (i.e., a cable core, or a core).

An "ethylene-based polymer," "ethylene polymer," or "polyethylene" is a polymer that contains equal to or greater than 50 wt %, or a majority amount of polymerized ethylene based on the weight of the polymer, and, optionally, may comprise one or more comonomers. The generic term "ethylene-based polymer" thus includes ethylene homopolymer and ethylene interpolymer.

An "ethylene/α-olefin polymer" is an polymer that contains a majority amount of polymerized ethylene, based on the weight of the polymer, and one or more α-olefin comonomers.

"Moisture curable" and like terms indicate that the composition will cure, i.e., crosslink, upon exposure to water. Moisture cure can be with or without the assistance of a crosslinking catalyst (e.g., a silanol condensation catalyst), promoter, etc.

An "olefin-based polymer" or "polyolefin" is a polymer that contains equal to or greater than 50 wt %, or a majority amount of polymerized olefin monomer (based on the weight of the polymer), and optionally, may contain at least one comonomer. Nonlimiting examples of α-olefin monomer include $C_2$, or $C_3$ to $C_4$, or $C_6$, or $C_8$, or $C_{10}$, or $C_{12}$, or $C_{16}$, or $C_{18}$, or $C_{20}$ α-olefins, such as ethylene, propylene, 1-butene, 1-hexene, 4-methyl-1-pentene, and 1-octene. Nonlimiting examples of an olefin-based polymer include an ethylene-based polymer and a propylene-based polymer.

A "polymer" is a polymeric compound prepared by polymerizing monomers, whether of the same or a different type. The generic term polymer thus embraces the term "homopolymer" (employed to refer to polymers prepared from only one type of monomer, with the understanding that trace amounts of impurities can be incorporated into the polymer structure), and the term "interpolymer," which includes copolymers (employed to refer to polymers prepared from two different types of monomers), terpolymers (employed to refer to polymers prepared from three different types of monomers), and polymers prepared from more than three different types of monomers. Trace amounts of impurities, for example, catalyst residues, may be incorporated into and/or within the polymer. It also embraces all forms of copolymer, e.g., random, block, etc. The terms "ethylene/α-olefin polymer" and "propylene/α-olefin polymer" are indicative of copolymer as described above prepared from polymerizing ethylene or propylene respectively and one or more additional, polymerizable α-olefin comonomers. It is noted that although a polymer is often referred to as being "made of" one or more specified monomers, "based on" a specified monomer or monomer type, "containing" a specified monomer content, or the like, in this context the term "monomer" is understood to be referring to the polymerized remnant of the specified monomer and not to the unpolymerized species. In general, polymers herein are referred to has being based on "units" that are the polymerized form of a corresponding monomer.

A "propylene-based polymer," "propylene polymer," or "polypropylene" is a polymer that contains equal to or greater than 50 wt %, or a majority amount of polymerized propylene based on the weight of the polymer, and, optionally, may comprise one or more comonomers. The generic term "propylene-based polymer" thus includes propylene homopolymer and propylene interpolymer.

A "sheath" is a generic term and when used in relation to cables, it includes insulation coverings or layers, protective jackets and the like.

A "wire" is a single strand of conductive metal, e.g., copper or aluminum, or a single strand of optical fiber.

DETAILED DESCRIPTION

The present disclosure provides a composition suitable for wire and cable applications. The composition includes:
 a silanol functionalized polyolefin;
 an anhydride-free brominated flame retardant;
 antimony trioxide;
 optionally, a second polyolefin;
 optionally, an additive; and
 the composition has an antimony (Sb) to bromine (Br) molar ratio (Sb:Br molar ratio) from 0.37 to 1.05.

The composition contains antimony (Sb) and bromine (Br) at a molar ratio (Sb:Br molar ratio) from 0.37, or 0.39, or 0.41, or 0.42, or 0.43, or 0.44, or 0.45, or 0.50, or 0.51, or 0.55, or 0.60, or 0.61, or 0.62, or 0.65, or 0.66 to 0.70, or 0.71, or 0.75, or 0.79, or 0.80, or 0.82, or 0.85, or 0.90, or 0.95, or 1.00, or 1.05.

Not wishing to be bound by any particular theory, Applicants believe that a composition with a Sb:Br molar ratio from 0.37 to 1.05 results in improved flame retardant performance at a lower flame retardant loading.

A. Silanol Functionalized Polyolefin

The present composition includes a silanol functionalized polyolefin. A "silanol functionalized polyolefin" is a polymer that contains silane and equal to or greater than 50 wt %, or a majority amount, of polymerized α-olefin, based on the total weight of the polymer. The silanol functionalized polyolefin includes α-olefin/silane reactor copolymer, reactor silane-grafted polyolefin, in situ silane-grafted polyolefin, and combinations thereof. An "α-olefin/silane reactor copolymer" is formed from the copolymerization of an α-olefin (such as ethylene) and a hydrolyzable silane monomer (such as a vinyl silane monomer), prior to the polymer's incorporation into the present composition. A "reactor silane-grafted polyolefin" or "reactor Si-g-PO" is formed by a process such as the Sioplas process, in which a hydrolyzable silane monomer is grafted onto the backbone of a base polyolefin by a process such as extrusion, prior to the polymer's incorporation into the present composition. An "in situ silane-grafted polyolefin" is formed by a process such as the Monosil process, in which a hydrolyzable silane monomer is grafted onto the backbone of a base polyolefin during the extrusion of the present composition to form a coated conductor.

In an embodiment, the silanol functionalized polyolefin contains (i) from 50 wt %, or 55 wt %, or 60 wt %, or 65 wt %, or 70 wt % to 75 wt %, or 80 wt %, or 90 wt %, or 95 wt %, or 99 wt %, or 100 wt % α-olefin; (ii) from 0.5 wt %, or 0.8 wt %, or 1.0 wt %, or 1.2 wt %, or 1.5 wt % to 1.8 wt %, or 2.0 wt %, or 2.3 wt %, or 2.5 wt % silane; and, optionally, (iii) from 0 wt %, or 1 wt %, or 5 wt % to 10 wt %, or 15 wt %, or 20 wt %, or 25 wt %, or 30 wt %, or 35 wt %, or 40 wt %, or 45 wt %, or 50 wt % of an unsaturated ester such as ethyl acrylate, based on the total weight of the silanol functionalized polyolefin.

In an embodiment, the silanol functionalized polyolefin has a density from 0.910 g/cc, or 0.915 g/cc, or 0.920 g/cc, or 0.921 g/cc, or 0.922 g/cc, or 0.925 g/cc to 0.930 g/cc, or 0.935 g/cc, or 0.940 g/cc.

In an embodiment, the silanol functionalized polyolefin is a silanol functionalized polyethylene. A "silanol functionalized polyethylene" is a polymer that contains silane and equal to or greater than 50 wt %, or a majority amount, of polymerized ethylene, based on the total weight of the polymer.

In an embodiment, the silanol functionalized polyolefin is a silanol functionalized polyethylene selected from an ethylene/silane reactor copolymer, a reactor silane-grafted polyethylene ("reactor Si-g-PE"), an in situ silane-grafted polyethylene ("in situ Si-g-PE"), and combinations thereof.

In an embodiment, the silanol functionalized polyethylene contains (i) from 50 wt %, or 55 wt %, or 60 wt %, or 65 wt %, or 70 wt % to 75 wt %, or 80 wt %, or 90 wt %, or 95 wt %, or 99 wt %, or 100 wt % ethylene; (ii) from 0.5 wt %, or 0.8 wt %, or 1.0 wt %, or 1.2 wt %, or 1.5 wt % to 1.8 wt %, or 2.0 wt %, or 2.3 wt %, or 2.5 wt % silane; and, optionally, (iii) from 0 wt %, or 1 wt %, or 5 wt % to 10 wt %, or 15 wt %, or 20 wt %, or 25 wt %, or 30 wt %, or 35 wt %, or 40 wt %, or 45 wt %, or 50 wt % of an unsaturated ester such as ethyl acrylate, based on the total weight of the silanol functionalized polyethylene.

1. α-Olefin/Silane Reactor Copolymer

In an embodiment, the silanol functionalized polyolefin is an α-olefin/silane reactor copolymer. The α-olefin/silane reactor copolymer is prepared by the copolymerization of at least one α-olefin (such as ethylene) and a hydrolyzable silane monomer (such as a vinyl silane monomer), and optionally an unsaturated ester, prior to the polymer's incorporation into the present composition, as described, for example, in U.S. Pat. Nos. 3,225,018 and 4,574,133, each incorporated herein by reference.

a. α-Olefin

The α-olefin/silane reactor copolymer is prepared by the copolymerization of at least one α-olefin and a hydrolyzable silane monomer. Nonlimiting examples of suitable α-olefins include $C_2$, or $C_3$ to $C_4$, or $C_6$, or $C_8$, or $C_{10}$, or $C_{12}$, or $C_{16}$, or $C_{18}$, or $C_{20}$ α-olefins, such as ethylene, propylene, 1-butene, 1-hexene, 4-methyl-1-pentene, and 1-octene.

In an embodiment, the α-olefin/silane reactor copolymer is an ethylene/silane reactor copolymer. An "ethylene/silane reactor copolymer" contains silane and equal to or greater than 50 wt %, or a majority amount, of polymerized ethylene, based on the total weight of the polymer. The ethylene/silane reactor copolymer optionally includes a $C_3$, or $C_4$ to $C_6$, or $C_8$, or $C_{10}$, or $C_{12}$, or $C_{16}$, or $C_{18}$, or $C_{20}$ α-olefin; an unsaturated ester; and combinations thereof. In an embodiment, the ethylene/silane reactor copolymer contains ethylene and the hydrolyzable silane monomer as the only monomeric units.

b. Hydrolyzable Silane Monomer

A "hydrolyzable silane monomer" is a silane-containing monomer that will effectively copolymerize with an α-olefin (e.g., ethylene) to form an α-olefin/silane reactor copolymer (such as an ethylene/silane reactor copolymer), or graft to and crosslink an α-olefin polymer (i.e., a polyolefin) to form a reactor Si-g-PO or an in situ Si-g-PO. The hydrolyzable silane monomer has the following Structure (1):

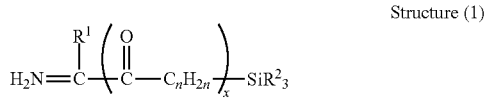

Structure (1)

in which $R^1$ is a hydrogen atom or methyl group; x is 0 or 1; n is an integer from 1 to 4, or 6, or 8, or 10, or 12; and each $R^2$ independently is a hydrolyzable organic group such as an alkoxy group having from 1 to 12 carbon atoms (e.g., methoxy, ethoxy, butoxy), an aryloxy group (e.g., phenoxy), an araloxy group (e.g., benzyloxy), an aliphatic acyloxy group having from 1 to 12 carbon atoms (e.g., formyloxy, acetyloxy, propanoyloxy), an amino or substituted amino group (e.g., alkylamino, arylamino), or a lower-alkyl group having 1 to 6 carbon atoms, with the proviso that not more than one of the three $R^2$ groups is an alkyl. The hydrolyzable silane monomer may be copolymerized with an α-olefin (such as ethylene) in a reactor, such as a high-pressure process to form an α-olefin/silane reactor copolymer. The hydrolyzable silane monomer may also be grafted to a polyolefin (such as a polyethylene) by the use of a suitable quantity of organic peroxide, such as 2,5-bis(tert-butylperoxy)-2,5-dimethylhexane, to form a reactor Si-g-PO or an in situ Si-g-PO. Nonlimiting examples of suitable hydrolyzable silane monomer include silane monomers that comprise an ethylenically unsaturated hydrocarbyl group, such as a vinyl, allyl, isopropenyl, butenyl, cyclohexenyl or gamma (meth) acryloxy allyl group, and a hydrolyzable group, such as, for example, a hydrocarbyloxy, hydrocarbonyloxy, or hydrocarbylamino group. Nonlimiting examples of suitable hydrolyzable groups include methoxy, ethoxy, formyloxy, acetoxy, proprionyloxy, and alkyl or arylamino groups. In an embodiment, the hydrolyzable silane monomer is an unsaturated alkoxy silane, which can be grafted onto the polyolefin or copolymerized in-reactor with an α-olefin (such as ethylene), and, optionally, other monomers (such as an unsaturated ester). These hydrolyzable silane monomers and their method of preparation are more fully described in U.S. Pat. No. 5,266,627, incorporated herein by reference. Nonlimiting examples of suitable hydrolyzable silane monomer include vinyltrimethoxysilane (VTMS), vinyltriethoxysilane (VTES), vinyltriacetoxysilane, and gamma-(meth)acryloxy propyl trimethoxy silane.

c. Unsaturated Ester

In an embodiment, the α-olefin/silane reactor copolymer is prepared by the copolymerization of at least one α-olefin, a hydrolyzable silane monomer, and an unsaturated ester. The unsaturated ester may be an alkyl acrylate, an alkyl methacrylate, or a vinyl carboxylate. "Alkyl" refers to a saturated linear, cyclic, or branched hydrocarbon group. Nonlimiting examples of suitable alkyl groups include, for example, methyl, ethyl, n-propyl, i-propyl, n-butyl, t-butyl, etc. In an embodiment, the alkyl group has from 1, or 2 to 4, or 8 carbon atoms. Nonlimiting examples of suitable alkyl acrylate include ethyl acrylate, methyl acrylate, t-butyl acrylate, n-butyl acrylate, and 2-ethylhexyl acrylate. Nonlimiting examples of suitable alkyl methacrylate include methyl methacrylate and n-butyl methacrylate. A "carboxylate" is a salt or ester of carboxylic acid. In an embodiment, the carboxylate group has from 2 to 5, or 6, or 8 carbon atoms. Nonlimiting examples of suitable vinyl carboxylate include vinyl acetate, vinyl propionate, and vinyl butanoate.

In an embodiment, the α-olefin/silane reactor copolymer is an ethylene/unsaturated ester/silane reactor copolymer. An "ethylene/unsaturated ester/silane reactor copolymer" is an ethylene/silane reactor copolymer that contains silane, an unsaturated ester, and equal to or greater than 50 wt %, or a majority amount, of polymerized ethylene, based on the total weight of the polymer.

Nonlimiting examples of suitable ethylene/silane reactor copolymer include SI-LINK™ DFDA-5451 NT and SI-LINK™ AC DFDB-5451 NT, each available from The Dow Chemical Company, Midland, Mich.

The α-olefin/silane reactor copolymer may comprise two or more embodiments disclosed herein.

2. Reactor Silane-Grafted Polyolefin and In Situ Silane-Grafted Polyolefin

In an embodiment, the silanol functionalized polyolefin is a reactor Si-g-PO or an in situ Si-g-PO. The reactor Si-g-PO is formed by a process such as the Sioplas process, in which a hydrolyzable silane monomer (such as a vinyl silane monomer) is grafted onto the backbone of a base polyolefin (such as a base polyethylene) by a process such as extrusion, prior to the polymer's incorporation into the present composition, as described, for example, in U.S. Pat. Nos. 4,574,133; 6,048,935; and 6,331,597, each incorporated herein by reference. The in situ Si-g-PO is formed by a process such as the Monosil process, in which a hydrolyzable silane monomer (such as a vinyl silane monomer) is grafted onto the backbone of a base polyolefin (such as a base polyethylene) during the extrusion of the present composition to form a coated conductor, as described, for example, in U.S. Pat. No. 4,574,133, incorporated herein by reference.

The hydrolyzable silane monomer used to prepare the reactor Si-g-PO or the in situ Si-g-PO may be any hydrolyzable silane monomer disclosed herein, such as VTMS.

a. Base Polyolefin

The reactor Si-g-PO and the in situ Si-g-PO is each prepared by grafting an a hydrolyzable silane monomer onto the backbone of a base polyolefin. In an embodiment, the base polyolefin is a base ethylene-based polymer or a base propylene-based polymer. In an embodiment, the base polyolefin is a base ethylene-based polymer. Nonlimiting examples of suitable base ethylene-based polymer include ethylene homopolymer and ethylene interpolymer containing one or more polymerizable comonomers, such as an unsaturated ester or an α-olefin. In an embodiment, the base ethylene-based polymer includes from 50 wt %, or 55 wt %, or 60 wt %, or 65 wt %, or 70 wt % to 75 wt %, or 80 wt %, or 90 wt %, or 95 wt %, or 99 wt %, or 100 wt % ethylene, based on the total weight of the base ethylene-based polymer.

In an embodiment, the base ethylene-based polymer is an ethylene/unsaturated ester copolymer. The unsaturated ester may be any unsaturated ester disclosed herein, such as ethyl acrylate. In an embodiment, the ethylene/unsaturated ester copolymer has a melt index from 0.5 g/10 min, or 1.0 g/10 min, or 1.3 g/10 min, or 2.0 g/10 min, to 5.0 g/10 min, or 10 g/10 min, or 15 g/10 min, or 20 g/10 min, or 25 g/10 min, or 30 g/10 min, or 35 g/10 min, or 40 g/10 min, or 45 g/10 min, or 50 g/10 min, measured in accordance with ASTM D1238 (190° C./2.16 kg). In an embodiment, the base ethylene-based copolymer is an ethylene/ethyl acrylate (EEA) copolymer. When the base ethylene-based copolymer is an EEA copolymer, the reactor Si-g-PO is a reactor silane-grafted EEA copolymer ("reactor Si-g-EEA"), and the in situ Si-g-PO is an in situ silane-grafted EEA copolymer ("in situ Si-g-EEA").

In an embodiment, the base ethylene-based polymer is an ethylene/α-olefin copolymer. The α-olefin contains from 3, or 4 to 6, or 8, or 10, or 12, or 16, or 18, or 20 carbon atoms. Nonlimiting examples of suitable α-olefin include propylene, butene, hexene, and octene. In an embodiment, the base ethylene-based copolymer is an ethylene/octene copolymer. When the base ethylene-based copolymer is an ethylene/α-olefin copolymer, the reactor Si-g-PO is a reactor silane-grafted ethylene/α-olefin copolymer, and the in situ Si-g-PO is an in situ silane-grafted ethylene/α-olefin copolymer.

In an embodiment, the base ethylene-based polymer is a low density polyethylene (LDPE). "Low density polyethylene" (or "LDPE") consists of ethylene homopolymer, or ethylene/α-olefin copolymer comprising at least one $C_3$-$C_{10}$ α-olefin, or $C_3$-$C_4$ α-olefin that has a density from 0.915 g/cc to 0.940 g/cc and contains long chain branching with broad molecular weight distribution. LDPE is typically produced by way of high pressure free radical polymerization (tubular reactor or autoclave with free radical initiator). Nonlimiting examples of LDPE include MarFlex™ (Chevron Phillips), LUPOLEN™ (LyondellBasell), as well as LDPE products from Borealis, Ineos, ExxonMobil, and others. When the base ethylene-based polymer is a LDPE, the reactor Si-g-PO is a reactor silane-grafted LDPE ("reactor Si-g-LDPE"), and the in situ Si-g-PO is an in situ silane-grafted LDPE ("in situ Si-g-LDPE").

In an embodiment, the base ethylene-based polymer is a linear low density polyethylene (LLDPE). "Linear low density polyethylene" (or "LLDPE") is a linear ethylene/α-olefin copolymer containing heterogeneous short-chain branching distribution comprising units derived from ethylene and units derived from at least one $C_3$-$C_{10}$ α-olefin comonomer or at least one $C_4$-$C_8$ α-olefin comonomer, or at least one $C_6$-$C_8$ α-olefin comonomer. LLDPE is characterized by little, if any, long chain branching, in contrast to conventional LDPE. LLDPE has a density from 0.910 g/cc, or 0.915 g/cc, or 0.920 g/cc, or 0.921 g/cc, or 0.925 g/cc to 0.930 g/cc, or 0.935 g/cc, or 0.940 g/cc. Nonlimiting examples of suitable LLDPE are DFDA-7530 NT, available from The Dow Chemical Company, Midland, Mich., and polymers sold under the tradename DOWLEX, available from The Dow Chemical Company, Midland, Mich. When the base ethylene-based polymer is a LLDPE, the reactor Si-g-PO is a reactor silane-grafted LLDPE ("reactor Si-g-LLDPE"), and the in situ Si-g-PO is an in situ silane-grafted LLDPE ("in situ Si-g-LLDPE").

In an embodiment, the silanol functionalized polyolefin, and further the silanol functionalized polyethylene is a blend of in situ Si-g-LLDPE and in situ Si-g-EEA.

The reactor Si-g-PO and the in situ Si-g-PO may comprise two or more embodiments disclosed herein.

The silanol functionalized polyolefin may comprise two or more embodiments disclosed herein.

B. Anhydride-Free Halogenated Flame Retardant

The present composition includes an anhydride-free halogenated flame retardant.

A "halogenated flame retardant" is a compound that contains at least one halogen atom and inhibits or delays the spread of fire by suppressing combustion reactions. A "halogen" is an element in IUPAC Group 17 of the Periodic Table of Elements, which includes fluorine (F), chlorine (Cl), bromine (Br), iodine (I), and astatine (At). An "anhydride-free" halogenated flame retardant excludes anhydride moieties. An "anhydride moiety" is a functional group having the following Structure (2):

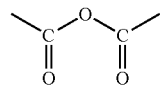

Structure (2)

Not wishing to be bound by any particular theory, Applicants believe the absence of anhydride moieties prevents the anhydride-free brominated flame retardant from contributing to the crosslinking of the silanol functionalized polyolefin. Nonetheless, a coated conductor with a coating containing the present composition having a Sb:Br molar ratio from 0.37 to 1.05 and the anhydride-free halogenated flame retardant is unexpectedly able to pass the horizontal burn test and/or the VW-1 burn test.

In an embodiment, the anhydride-free halogenated flame retardant is an anhydride-free brominated flame retardant. The anhydride-free brominated flame retardant contains at least one bromine atom and is void of an anhydride moiety. Nonlimiting examples of suitable anhydride-free brominated flame retardant include decabromodiphenyl ether (such as DE-83R, available from HB Chemicals); ethylene bis-tetrabromophthalimide (such as SAYTEX® BT-93W, available from ALBEMARLE); ethane-1,2-bis(pentabromophenyl) (such as SAYTEX® 8010, available from ALBEMARLE); n,n'-bis(tetrabromalophthalimide) (such as CN-1753, available from Great Lakes Solutions); brominated polymers such as brominated polystyrene, poly(4-bromostyrene), poly(bromostyrene), brominated natural rubber, brominated synthetic rubber, polyvinyl bromide, poly(vinylidene bromide, poly(2-bromoethyl methacrylate), poly(2,3-dibromopropyl methacrylate), and poly(methyl-α-bromoacrylate), butadiene styrene brominated copolymer; and combinations thereof.

In an embodiment, the anhydride-free brominated flame retardant is selected from decabromodiphenyl ether; ethylene bis-tetrabromophthalimide; ethane-1,2-bis(pentabromophenyl); n,n'-bis(tetrabromalophthalimide); and combinations thereof. In a further embodiment, the anhydride-free brominated flame retardant is ethane-1,2-bis(pentabromophenyl).

In an embodiment, the composition contains a single halogenated flame retardant that is the anhydride-free brominated flame retardant. A composition containing a single brominated flame retardant contains one, and only one, halogenated flame retardant, and excludes compositions containing two or more halogenated flame retardants.

The anhydride-free halogenated flame retardant, and further the anhydride-free brominated flame retardant, may comprise two or more embodiments disclosed herein.

C. Antimony Trioxide

The present composition includes antimony trioxide.

Antimony trioxide ($Sb_2O_3$) has the following Structure (3):

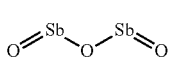

Structure (3)

Antimony trioxide has a molecular weight (Mw) of 291.518 grams per mole (g/mol). One gram of antimony trioxide ($Sb_2O_3$) contains 0.835345774 grams antimony (Sb).

Nonlimiting examples of suitable antimony trioxide include MICROFINE™ AO9 from Great Lakes Solution, and BRIGHTSUN™ HB from China Antimony Chemicals Co., Ltd.

D. Second Polyolefin

The present composition may include an optional second polyolefin. When the second polyolefin is present, it is different than the silanol functionalized polyolefin because the second polyolefin is not silanol functionalized. The second polyolefin is selected from a second ethylene-based polymer and a second propylene-based polymer. The second polyolefin and the base polyolefin that is used to form the reactor Si-g-PO or the in situ Si-g-PO may be the same or different.

In an embodiment, the second polyolefin is a second ethylene-based polymer. The second ethylene-based polymer may be any base ethylene-based polymer disclosed herein. In an embodiment, the second ethylene-based polymer is LLDPE. In another embodiment, the second ethylene-based polymer is EEA copolymer. In an embodiment, the second ethylene-based polymer and the base ethylene-based polymer that is used to form the reactor Si-g-PE or the in situ Si-g-PE are the same. In another embodiment, the second ethylene-based polymer and the base ethylene-based polymer that is used to form the reactor Si-g-PE or the in situ Si-g-PE are different.

In an embodiment, the second polyolefin is a second propylene-based polymer. The second propylene-based polymer may be any base propylene-based polymer disclosed herein. A nonlimiting example of a suitable propylene-based polymer is a propylene-based interpolymer containing one or more polymerizable comonomers, such as a $C_2$ α-olefin, a $C_4$-$C_{20}$ α-olefin, and a diene.

The second polyolefin may comprise two or more embodiments disclosed herein.

E. Additives

The present composition may include one or more additives. Nonlimiting examples of suitable additives include antioxidants, colorants, corrosion inhibitors, lubricants, silanol condensation catalysts, ultra violet (UV) absorbers or stabilizers, anti-blocking agents, flame retardants, coupling agents, compatibilizers, plasticizers, fillers, processing aids, and combinations thereof.

In an embodiment, the composition includes an antioxidant. Nonlimiting examples of suitable antioxidants include phenolic antioxidants, thio-based antioxidants, phosphate-based antioxidants, and hydrazine-based metal deactivators. Suitable phenolic antioxidants include high molecular weight hindered phenols, methyl-substituted phenol, phenols having substituents with primary or secondary carbonyls, and multifunctional phenols such as sulfur and phosphorous-containing phenol. Representative hindered phenols include 1,3,5-trimethyl-2,4,6-tris-(3,5-di-tert-butyl-4-hydroxybenzyl)-benzene; pentaerythrityl tetrakis-3(3,5-di-tert-butyl-4-hydroxyphenyl)-propionate; n-octadecyl-3 (3,5-di-tert-butyl-4-hydroxyphenyl)-propionate; 4,4'-methylenebis(2,6-tert-butyl-phenol); 4,4'-thiobis(6-tert-butyl-o-cresol); 2,6-di-tertbutylphenol; 6-(4-hydroxyphenoxy)-2,4-bis(n-octyl-thio)-1,3,5 triazine; di-n-octylthio)ethyl 3,5-di-tert-butyl-4-hydroxy-benzoate; and sorbitol hexa[3-(3,5-di-tert-butyl-4-hydroxy-phenyl)-propionate]. In an embodiment, the composition includes pentaerythritol tetrakis(3-(3,5-di-tert-butyl-4-hydroxyphenyl) propionate), commercially available as Irganox® 1010 from BASF. A nonlimiting example of a suitable methyl-substituted phenol is isobutylidenebis(4,6-dimethylphenol). A nonlimiting example of a suitable hydrazine-based metal deactivator is oxalyl bis(benzylidiene hydrazide). In an embodiment, the composition contains from 0 wt %, or 0.001 wt %, or 0.01 wt %, or 0.02 wt %, or 0.05 wt %, or 0.1 wt %, or 0.2 wt %, or 0.3 wt %, or 0.4 wt % to 0.5 wt %, or 0.6 wt %, or 0.7 wt %, or 0.8 wt %, or 1.0 wt %, or 2.0 wt %, or 2.5 wt %, or 3.0 wt % antioxidant, based on total weight of the composition.

In an embodiment, the composition includes silanol condensation catalyst, such as Lewis and Brønsted acids and bases. A "silanol condensation catalyst" promotes crosslinking of the silanol functionalized polyolefin. Lewis acids are chemical species that can accept an electron pair from a Lewis base. Lewis bases are chemical species that can donate an electron pair to a Lewis acid. Nonlimiting examples of suitable Lewis acids include the tin carboxylates such as dibutyl tin dilaurate (DBTDL), dimethyl hydroxy tin oleate, dioctyl tin maleate, di-n-butyl tin maleate, dibutyl tin diacetate, dibutyl tin dioctoate, stannous acetate, stannous octoate, and various other organo-metal compounds such as lead naphthenate, zinc caprylate and cobalt naphthenate. Nonlimiting examples of suitable Lewis bases include the primary, secondary and tertiary amines. These catalysts are typically used in moisture cure applications. In an embodiment, the composition includes from 0 wt %, or 0.001 wt %, or 0.005 wt %, or 0.01 wt %, or 0.02 wt %, or 0.03 wt % to 0.05 wt %, or 0.1 wt %, or 0.2 wt %, or 0.5 wt %, or 1.0 wt % silanol condensation catalyst, based on the total weight of the composition. The silanol condensation catalyst is typically added to the reaction-extruder so that it is present during the grafting reaction of silane to the polyolefin backbone to form the in situ Si-g-PO. As such, the silanol functionalized polyolefin may experience some crosslinking before it leaves the extruder with the completion of the crosslinking after it has left the extruder, typically upon exposure to moisture (e.g., a sauna bath or a cooling bath) and/or the humidity present in the environment in which it is stored, transported or used.

In an embodiment, the silanol condensation catalyst is included in a catalyst masterbatch blend, and the catalyst masterbatch is included in the composition. Nonlimiting examples of suitable catalyst masterbatch include those sold under the trade name SI-LINK™ from The Dow Chemical Company, including SI-LINK™ DFDA-5481 Natural and SI-LINK™ AC DFDA-5488 NT. SI-LINK™ DFDA-5481 Natural is a catalyst masterbatch containing a blend of 1-butene/ethene polymer, ethene homopolymer, phenolic compound antioxidant, dibutyltin dilaurate (DBTDL) (a silanol condensation catalyst), and a phenolic hydrazide compound. SI-LINK™ AC DFDA-5488 NT is a catalyst masterbatch containing a blend of a thermoplastic polymer, a phenolic compound antioxidant, and a hydrophobic acid catalyst (a silanol condensation catalyst). In an embodiment, the composition contains from 0 wt %, or 0.001 wt %, or 0.01 wt %, or 0.5 wt %, or 1.0 wt %, or 2.0 wt %, or 3.0 wt %, or 4.0 wt % to 5.0 wt %, or 6.0 wt %, or 7.0 wt %, or 8.0 wt %, or 9.0 wt %, or 10.0 wt % catalyst masterbatch, based on total weight of the composition.

In an embodiment, the composition includes an ultra violet (UV) absorber or stabilizer. A nonlimiting example of a suitable UV stabilizer is a hindered amine light stabilizer (HALS). A nonlimiting example of a suitable HALS is 1,3,5-Triazine-2,4,6-triamine, N,N-1,2-ethanediylbisN-3-4, 6-bisbutyl(1,2,2,6,6-pentamethyl-4-piperidinypamino-1,3, 5-triazin-2-ylaminopropyl-N,N-dibutyl-N,N-bis(1,2,2,6,6-pentamethyl-4-piperidinyl)-1,5,8,12-tetrakis[4,6-bis(n-butyl-n-1,2,2,6,6-pentamethyl-4-piperidylamino)-1,3,5-triazin-2-yl]-1,5,8,12-tetraazadodecane, which is commercially available as SABO™ STAB UV-119 from SABO S.p.A. of Levate, Italy. In an embodiment, the composition contains from 0 wt %, or 0.001 wt %, or 0.002 wt %, or 0.005 wt %, or 0.006 wt % to 0.007 wt %, or 0.008 wt %, or 0.009 wt %, or 0.01 wt %, or 0.2 wt %, or 0.3 wt %, or 0.4 wt %, or 0.5 wt %, 1.0 wt %, or 2.0 wt %, or 2.5 wt %, or 3.0 wt % UV absorber or stabilizer, based on total weight of the composition.

In an embodiment, the composition includes a filler. Nonlimiting examples of suitable fillers include zinc oxide, zinc borate, zinc molybdate, zinc sulfide, carbon black, organo-clay, and combinations thereof. The filler may or may not have flame retardant properties. In an embodiment, the filler is coated with a material that will prevent or retard any tendency that the filler might otherwise have to interfere with the silane cure reaction. Stearic acid is illustrative of such a filler coating. In an embodiment, the composition contains from 0 wt %, or 0.01 wt %, or 0.02 wt %, or 0.05 wt %, or 0.07 wt %, or 0.1 wt %, or 0.2 wt %, or 0.3 wt %, or 0.4 wt % to 0.5 wt %, or 0.6 wt %, or 0.7 wt %, or 0.8 wt %, or 1.0 wt %, or 2.0 wt %, or 2.5 wt %, or 3.0 wt %, or 5.0 wt %, or 8.0 wt %, or 10.0 wt %, or 20 wt % filler, based on total weight of the composition.

In another embodiment, the composition excludes filler additives. When the composition excludes filler additives, the only fillers present in the composition are the anhydride-free halogenated flame retardant and the antimony trioxide.

In an embodiment, the composition includes a processing aid. Nonlimiting examples of suitable processing aids include oils, organic acids (such as stearic acid), and metal salts of organic acids (such as zinc stearate). In an embodiment, the composition contains from 0 wt %, or 0.01 wt %, or 0.02 wt %, or 0.05 wt %, or 0.07 wt %, or 0.1 wt %, or 0.2 wt %, or 0.3 wt %, or 0.4 wt % to 0.5 wt %, or 0.6 wt %, or 0.7 wt %, or 0.8 wt %, or 1.0 wt %, or 2.0 wt %, or 2.5 wt %, or 3.0 wt % processing aid, based on total weight of the composition.

In an embodiment, the composition contains from 0 wt %, or greater than 0 wt %, or 0.001 wt %, or 0.002 wt %, or 0.005 wt %, or 0.006 wt % to 0.007 wt %, or 0.008 wt %, or 0.009 wt %, or 0.01 wt %, or 0.2 wt %, or 0.3 wt %, or 0.4 wt %, or 0.5 wt %, 1.0 wt %, or 2.0 wt %, or 2.5 wt %, or 3.0 wt %, or 4.0 wt %, or 5.0 wt % to 6.0 wt %, or 7.0 wt %, or 8.0 wt %, or 9.0 wt %, or 10.0 wt %, or 15.0 wt %, or 20.0 wt %, or 30 wt %, or 40 wt %, or 50 wt % additive, based on the total weight of the composition.

The additive may comprise two or more embodiments disclosed herein.

F. Composition

In an embodiment, the composition includes: (A) a silanol functionalized polyolefin (e.g., a silanol functionalized polyethylene); (B) an anhydride-free halogenated flame retardant (e.g., an anhydride-free brominated flame retardant); (C) antimony trioxide; (D) optional second polyolefin; and (E) optional additive; and the composition has an antimony (Sb) to bromine (Br) molar ratio (Sb:Br molar ratio) from 0.37 to 1.05.

The silanol functionalized polyolefin, anhydride-free halogenated flame retardant, antimony trioxide, second polyolefin, and additive may be any respective silanol functionalized polyolefin, anhydride-free halogenated flame retardant, antimony trioxide, second polyolefin, and additive disclosed herein.

The composition contains antimony (Sb) and bromine (Br) at a molar ratio (Sb:Br molar ratio) from 0.37, or 0.39, or 0.41, or 0.42, or 0.43, or 0.44, or 0.45, or 0.50, or 0.51, or 0.55, or 0.60, or 0.61, or 0.62, or 0.65, or 0.66 to 0.70, or 0.71, or 0.75, or 0.79, or 0.80, or 0.82, or 0.85, or 0.90, or 0.95, or 1.00, or 1.05. The Sb:Br molar ratio is calculated in accordance with the following Equation (1):

$$\text{Sb:Br molar ratio} = \frac{\text{moles of antimony in composition}}{\text{moles of bromine in composition}}. \quad \text{Equation (1)}$$

The number of moles of antimony (Sb) from the antimony trioxide ($Sb_2O_3$) is calculated in accordance with the following Equation (1A):

$$\text{moles of antimony in composition} = \quad \text{Equation (1A)}$$
$$\frac{(\text{grams } Sb_2O_3 \text{ in composition} \times 0.835345774)}{121.76}.$$

The number of moles of bromine from the brominated flame retardant, and further the anhydride-free brominated flame retardant, is calculated in accordance with the following Equation (1B):

$$\text{moles of bromine in composition} = \quad \text{Equation (1B)}$$
$$\frac{(\text{grams of bromine in composition})}{79.904}.$$

In an embodiment, the composition has a Sb:Br molar ratio from 0.37, or 0.39, or 0.41, or 0.42, or 0.43, or 0.44, or 0.45, or 0.50, or 0.51, or 0.55, or 0.60, or 0.61, or 0.62, or 0.65, or 0.66 to 0.70, or 0.71, or 0.75, or 0.79, or 0.80, or 0.82, or 0.85, or 0.90, or 0.95, or 1.00, or 1.05; and the composition contains (A) from 10 wt %, or 15 wt %, or 20 wt %, or 25 wt %, or 30 wt %, or 35 wt %, or 40 wt %, or 50 wt % to 60 wt %, or 70 wt %, or 75 wt % or 80 wt %, or 85 wt %, or 90 wt %, or 97 wt %, or 98 wt % silanol functionalized polyolefin; (B) from 0.1 wt %, or 0.5 wt %, or 1 wt %, or 2 wt %, or 3 wt %, or 4 wt %, or 5 wt % to 10 wt %, or 15 wt %, or 20 wt %, or 25 wt %, or 30 wt %, or 35 wt %, or 40 wt % anhydride-free halogenated flame retardant; and (C) from 0.1 wt %, or 0.5 wt %, or 1 wt %, or 2 wt %, or 3 wt %, or 4 wt %, or 5 wt % to 10 wt %, or 15 wt %, or 20 wt %, or 25 wt %, or 30 wt %, or 35 wt %, or 40 wt % antimony trioxide, based on the total weight of the composition; and the combined amount of anhydride-free halogenated flame retardant and antimony trioxide equals from 1 wt %, or 5 wt %, or 10 wt %, to 14 wt %, or 15 wt %, or 20 wt %, or 25 wt %, or 30 wt %, or 35 wt %, or 40 wt %, or 45 wt %, or 50 wt % of the total composition.

In an embodiment, the composition has a Sb:Br molar ratio from 0.37, or 0.39, or 0.41, or 0.42, or 0.43, or 0.44, or 0.45, or 0.50, or 0.51, or 0.55, or 0.60, or 0.61, or 0.62, or 0.65, or 0.66 to 0.70, or 0.71, or 0.75, or 0.79, or 0.80, or 0.82, or 0.85, or 0.90, or 0.95, or 1.00, or 1.05; and the composition contains (A) from 10 wt %, or 15 wt %, or 20 wt %, or 25 wt %, or 30 wt %, or 35 wt %, or 40 wt %, or 50 wt % to 60 wt %, or 70 wt %, or 75 wt % or 80 wt %, or 85 wt %, or 90 wt %, or 97 wt %, or 98 wt % silanol functionalized polyolefin; (B) from 0.1 wt %, or 0.5 wt %, or 1 wt %, or 2 wt %, or 3 wt %, or 4 wt %, or 5 wt % to 10 wt %, or 15 wt %, or 20 wt %, or 25 wt %, or 30 wt %, or 35 wt %, or 40 wt % anhydride-free halogenated flame retardant; (C) from 0.1 wt %, or 0.5 wt %, or 1 wt %, or 2 wt %, or 3 wt %, or 4 wt %, or 5 wt % to 10 wt %, or 15 wt %, or 20 wt %, or 25 wt %, or 30 wt %, or 35 wt %, or 40 wt % antimony trioxide; and (D) from 1 wt %, or 5 wt %, or 8 wt %, or 10 wt % to 15 wt %, or 20 wt %, or 25 wt %, or 30 wt %, or 35 wt %, or 40 wt %, or 50 wt % of the second polyolefin, based on the total weight of the composition; and the combined amount of anhydride-free halogenated flame retardant and antimony trioxide equals from 1 wt %, or 5 wt %, or 10 wt %, to 14 wt %, or 15 wt %, or 20 wt %, or 25 wt %, or 30 wt %, or 35 wt %, or 40 wt %, or 45 wt %, or 50 wt % of the total composition.

In an embodiment, the composition contains:
from 35 wt %, or 40 wt %, or 45 wt % to 50 wt %, or 55 wt %, or 60 wt %, or 65 wt % of the silanol functionalized polyethylene, such as an ethylene/silane reactor copolymer; from 15 wt %, or 17 wt %, or 20 wt % to 25 wt %, or 30 wt % of the anhydride-free brominated flame retardant, such as ethane-1,2-bis(pentabromophenyl);
from 10 wt %, or 15 wt %, or 17 wt % to 20 wt %, or 25 wt % of the antimony trioxide; from 0 wt %, or 1 wt %, or 2 wt %, or 5 wt %, or 10 wt % to 15 wt %, or 20 wt % of a second polyolefin, such as an LLDPE or an EEA copolymer; and the composition has a Sb:Br molar ratio from 0.47, or 0.50, or 0.51 to 0.55, or 0.60, or 0.70, or 0.80.

In an embodiment, the composition contains:
from 30 wt %, or 40 wt % to 50 wt %, or 60 wt % of the silanol functionalized polyethylene, such as an in situ Si-g-PE (e.g., in situ Si-g-LLDPE);
from 10 wt %, or 15 wt % to 26 wt %, or 30 wt % of the anhydride-free brominated flame retardant, such as ethane-1,2-bis(pentabromophenyl);
from 10 wt %, or 14 wt % to 24 wt %, or 25 wt %, or 30 wt % of the antimony trioxide; from 5 wt %, or 9 wt % to 10 wt %, or 15 wt %, or 20 wt % of a second polyolefin, such as an EEA copolymer, and
the composition has a Sb:Br molar ratio from 0.37, or 0.39, or 0.42, or 0.44 to 0.95, or 1.00, or 1.05.

In an embodiment, the composition contains:
from 60 wt %, or 70 wt %, or 75 wt %, or 80 wt % to 85 wt %, or 90 wt %, or 95 wt %, or 97 wt % of the silanol functionalized polyethylene, such as an ethylene/silane reactor copolymer;
from 1 wt %, or 5 wt % to 10 wt %, or 15 wt %, or 20 wt % of the anhydride-free brominated flame retardant, such as ethane-1,2-bis(pentabromophenyl);
from 1 wt %, or 4 wt % to 10 wt %, or 15 wt %, or 17 wt % to 20 wt % of the antimony trioxide; from 1 wt %, or 2 wt %, or 5 wt % to 10 wt %, or 15 wt % of a second polyolefin, such as an EEA copolymer, and the composition has a Sb:Br molar ratio from 0.50, or 0.51 to 0.55, or 0.60, or 0.65, or 0.70.

In an embodiment, the combined amount of anhydride-free brominated flame retardant and antimony trioxide equals from 1 wt %, or 5 wt %, or 10 wt %, to 14 wt %, or 15 wt %, or 20 wt %, or 25 wt %, or 30 wt %, or 35 wt %, or 40 wt %, or 45 wt %, or 50 wt % of the total composition, and the composition has a Sb:Br molar ratio from 0.37, or 0.39, or 0.41, or 0.42, or 0.43, or 0.44, or 0.45, or 0.50, or 0.51, or 0.55, or 0.60, or 0.61, or 0.62, or 0.65, or 0.66 to 0.70, or 0.71, or 0.75, or 0.79, or 0.80, or 0.82, or 0.85, or 0.90, or 0.95, or 1.00, or 1.05. A lower combined amount of anhydride-free brominated flame retardant and antimony trioxide advantageously allows for improved processability compared to typical halogenated flame retardant compositions containing a higher load of flame retardants. The lower the amount of flame retardant, the lower the deleterious effects on composition mechanical performance, such as elongation and impact strength, known to be caused by high flame retardant loadings.

It is understood that the sum of the components in each of the foregoing compositions yields 100 weight percent (wt %).

In an embodiment, the only metal element present in the composition is antimony, with the exception of residual catalyst metals such as tin and/or aluminum. When the composition excludes metal elements other than antimony, metal-containing compounds such as magnesium hydroxide are excluded from the present composition.

In an embodiment, the composition is moisture-curable. In another embodiment, the composition is crosslinked.

In an embodiment, the composition is formed by forming a flame retardant masterbatch containing the anhydride-free brominated flame retardant, the antimony trioxide, optionally a base polyolefin (e.g., an ethylene/ethyl acrylate copolymer), and optionally one or more additives (e.g., an antioxidant and/or a HALS). The flame retardant masterbatch may then be combined with (i) the hydrolyzable silane monomer, and/or the α-olefin/silane reactor copolymer, and/or the reactor silane-grafted polyolefin; and (ii) optionally, one or more additives (e.g., the silanol condensation catalyst) to form the present composition. The flame retardant masterbatch has an Sb:Br molar ratio from 0.37, or 0.39, or 0.41, or 0.42, or 0.43, or 0.44, or 0.45, or 0.50, or 0.51, or 0.55, or 0.60, or 0.61, or 0.62, or 0.65, or 0.66 to 0.70, or 0.71, or 0.75, or 0.79, or 0.80, or 0.82, or 0.85, or 0.90, or 0.95, or 1.00, or 1.05. The Sb:Br molar ratio of the flame retardant masterbatch is the same as the Sb:Br molar ratio of the composition. The composition has an Sb:Br molar ratio from 0.37, or 0.39, or 0.41, or 0.42, or 0.43, or 0.44, or 0.45, or 0.50, or 0.51, or 0.55, or 0.60, or 0.61, or 0.62, or 0.65, or 0.66 to 0.70, or 0.71, or 0.75, or 0.79, or 0.80, or 0.82, or 0.85, or 0.90, or 0.95, or 1.00, or 1.05.

In an embodiment, the composition contains:
(i) a flame retardant masterbatch including:
an anhydride-free brominated flame retardant;
antimony trioxide;
optionally, an ethylene/ethyl acrylate copolymer; and
optionally, one or more additives (e.g., an antioxidant and/or a HALS);
(ii) an α-olefin/silane reactor copolymer;
(iii) optionally, one or more additives (e.g., a silanol condensation catalyst or catalyst masterbatch blend); and
the composition has an Sb:Br molar ratio from 0.37, or 0.39, or 0.41, or 0.42, or 0.43, or 0.44, or 0.45, or 0.50, or 0.51, or 0.55, or 0.60, or 0.61, or 0.62, or 0.65, or 0.66 to 0.70, or 0.71, or 0.75, or 0.79, or 0.80, or 0.82, or 0.85, or 0.90, or 0.95, or 1.00, or 1.05.

The composition may comprise two or more embodiments disclosed herein.

G. Coated Conductor

The present disclosure also provides a coated conductor. The coated conductor includes a conductor and a coating on the conductor, the coating including the present composition. The present composition includes a silanol functionalized polyolefin (such as a silanol functionalized polyethylene), an anhydride-free halogenated flame retardant (such as an anhydride-free brominated flame retardant), antimony trioxide, optional second polyolefin, and optional additive, and the present composition has an antimony (Sb) to bromine (Br) molar ratio (Sb:Br molar ratio) from 0.37 to 1.05. The present composition may be any composition previously disclosed herein.

The present composition contains antimony (Sb) and bromine (Br) at a molar ratio (Sb:Br molar ratio) from 0.37, or 0.39, or 0.41, or 0.42, or 0.43, or 0.44, or 0.45, or 0.50, or 0.51, or 0.55, or 0.60, or 0.61, or 0.62, or 0.65, or 0.66 to 0.70, or 0.71, or 0.75, or 0.79, or 0.80, or 0.82, or 0.85, or 0.90, or 0.95, or 1.00, or 1.05.

In an embodiment, the present composition contains a single halogenated flame retardant that is the anhydride-free brominated flame retardant. In another embodiment, the coating contains a single halogenated flame retardant that is the anhydride-free brominated flame retardant.

In an embodiment, the coating is an insulation sheath for a conductor. In another embodiment, the coating is a jacket for a conductor.

The process for producing a coated conductor includes heating the present composition to at least the melting temperature of the silanol functionalized polyolefin, and then extruding the polymeric melt blend onto the conductor. The term "onto" includes direct contact or indirect contact between the polymeric melt blend and the conductor. The polymeric melt blend is in an extrudable state.

The coating is located on the conductor. The coating may be one or more inner layers such as an insulating layer. The coating may wholly or partially cover or otherwise surround or encase the conductor. The coating may be the sole component surrounding the conductor. Alternatively, the coating may be one layer of a multilayer jacket or sheath encasing the metal conductor. In an embodiment, the coating directly contacts the conductor. In another embodiment, the coating directly contacts an insulation layer surrounding the conductor.

The coating is crosslinked. In an embodiment, crosslinking of the present composition begins in the extruder, but only to a minimal extent. In another embodiment, crosslinking is delayed until the composition is extruded upon the conductor. Crosslinking of the present composition can be initiated and/or accelerated through the application of heat or radiation.

In an embodiment, the coated conductor passes the horizontal burn test. To pass the horizontal burn test, the coated conductor must have a total char of less than 100 mm and a time to self-extinguish of less than 80 seconds. In an embodiment, the coated conductor has a total char during the horizontal burn test from 0 mm, or 5 mm, or 10 mm to 50 mm, or 55 mm, or 60 mm, or 70 mm, or 75 mm, or 80 mm, or 90 mm, or less than 100 mm. In an embodiment, the coated conductor has a time to self-extinguish during the horizontal burn test from 0 seconds (sec.), or 5 sec., or 10 sec. to 30 sec., or 35 sec., or 40 sec., or 50 sec., or 60 sec., or 70 sec., or less than 80 sec.

In an embodiment, the coated conductor passes the VW-1 test. To pass the VW-1 test and thus have a VW-1 rating, the coated conductor must self-extinguish within 60 seconds 60 sec.) of the removal of a burner for each of 5 cycles, exhibit no flag burn, and exhibit no cotton burn. The VW-1 test is more stringent than the horizontal burn test. In an embodiment, the coated conductor has a time to self-extinguish during the VW-1 test from 0 sec. to 20 sec., or 30 sec., or 40 sec., or 50 sec., or 60 sec., or 70 sec., or less than 80 sec. during each of the 5 individual cycles. In an embodiment, the coated conductor has a no char to flag length during the VW-1 test from 20 mm, or 40 mm, or 50 mm, or 75 mm to 100 mm, or 110 mm, or 120 mm, or 130 mm, or 140 mm, or 150 mm, or 160 mm, or 180 mm, or 200 mm, or 250 mm, or 300 mm, or 350 mm, or 400 mm, or 500 mm, or 508 mm.

In an embodiment, the coated conductor has a hot creep from 0%, or 1%, or 2% to 5%, or 9%, or 10%, or 15%, or 20%, or 25%, or 30%, or 40%, or 50%, or 60%, or 70%, or 75%, or 80%, or 90%, or 100% at 20 N and 200° C.

In an embodiment, the coated conductor has a wet insulation resistance from 100 megaohm/1000 feet (Mohm/1000 ft), or 10,000 Mohm/1000 ft, or 100,000 Mohm/1000 ft, or 1,000,000 Mohm/1000 ft, or 10,000,000 Mohm/1000 ft, or 15,000,000 Mohm/1000 ft, or 20,000,000 Mohm/1000 ft, or 30,000,000 Mohm/1000 ft, or 40,000,000 Mohm/1000 ft to 65,000,000 Mohm/1000 ft, or 70,000,000 Mohm/1000 ft, or 80,000,000 Mohm/1000 ft, or 90,000,000 Mohm/1000 ft, or 95,000,000 Mohm/1000 ft, or 100,000,000 Mohm/1000 ft, or 150,000,000 Mohm/1000 ft at 75° C. from 0 to 25 weeks (0 to 175 days) and/or at 90° C. from 0 to 25 weeks (0 to 175 days).

In an embodiment, the coating includes the present composition that contains antimony (Sb) and bromine (Br) at a molar ratio (Sb:Br molar ratio) from 0.37, or 0.39, or 0.41, or 0.42, or 0.43, or 0.44, or 0.45, or 0.50, or 0.51, or 0.55, or 0.60, or 0.61, or 0.62, or 0.65, or 0.66 to 0.70, or 0.71, or 0.75, or 0.79, or 0.80, or 0.82, or 0.85, or 0.90, or 0.95, or 1.00, or 1.05; and the coated conductor has one, some, or all of the following properties: (i) a total char during the horizontal burn test from 0 mm to less than 100 mm; (ii) a time to self-extinguish during the horizontal burn test from 0 sec. to less than 80 sec; (iii) a time to self-extinguish during the VW-1 test from 0 sec. to less than 80 sec. during each of the 5 individual cycles; (iv) a no char to flag length during the VW-1 test from 20 mm, or 40 mm to 160 mm, 200 mm, 300 mm, or 400 mm, or 500 mm, or 508 mm; (v) a hot creep from 0%, to 100% at 20 N and 200° C.; (vi) a wet insulation resistance from 100 Mohm/ft to 150,000,000 Mohm/1000 ft at 75° C. from 0 to 25 weeks; and (vii) a wet insulation resistance from 100 Mohm/ft to 150,000,000 Mohm/1000 ft at 90° C. from 0 to 25 weeks. In an embodiment, the coated conductor passes the horizontal burn test and/or the VW-1 test. In an embodiment, the combined amount of anhydride-free brominated flame retardant and antimony trioxide equals from 1 wt %, or 5 wt %, or 10 wt %, to 14 wt %, or 15 wt %, or 20 wt %, or 25 wt %, or 30 wt %, or 35 wt %, or 40 wt %, or 45 wt %, or 50 wt % of the total composition.

Not wishing to be bound by any particular theory, Applicants believe that the coating composition with a Sb:Br molar ratio from 0.37, or 0.39 to 0.95, or 1.05 results in improved flame retardant performance at a lower flame retardant loading. The unexpected flame retardant synergy is exemplified by the coated conductor passing the horizontal burn test and/or the VW-1 burn test. Coated conductors containing coating with a composition having a Sb:Br molar ratio less than 0.37 or greater than 1.05 are unable to achieve these results.

In an embodiment, the coated conductor is wiring for consumer electronics, a power cable, a power charger wire for cell phones and/or computers, computer data cords, power cords, appliance wiring material, home interior wiring material, and consumer electronic accessory cords.

In another embodiment, the present composition is melt-shaped into an article other than a coating on a conductor, e.g., an electrical connector or a component of an electrical connector.

The coated conductor may comprise two or more embodiments disclosed herein.

TEST METHODS

Density is measured in accordance with ASTM D792, Method B. The result is recorded in grams (g) per cubic centimeter (g/cc or g/cm$^3$).

Flash point is measured in accordance with ASTM D 3278.

Melt index (MI) (also known as $I_2$) is measured in accordance with ASTM D1238, Condition 190° C./2.16 kilogram (kg) weight and is reported in grams eluted per 10 minutes (g/10 min).

Hot creep is measured by placing an end of a coated wire specimen in the jaws of a pre-heated support apparatus. The hot creep test is done at 150° C. with a 20 N/cm$^2$ weight attached to the lower end of the coated wire specimen. The percent elongation of the specimen from its initial value is recorded after exposure in the oven for 15 minutes without removing the specimen from the oven. The specimen passes if the elongation is less than 100%. Three specimens are tested for each sample, and the average value is reported for each sample.

Wet insulation resistance (IR) is measured in accordance with UL-44. Two 15-foot (4.572 meter) lengths of coated conductor is cut from each sample. One length is placed in a 75° C. water bath, and the other length is placed in a 90° C. water bath. Each sample is tested on a weekly basis for 25 weeks.

Differential Scanning calorimetry (DSC)

Differential Scanning calorimetry (DSC) is conducted on a TA Instruments Thermal Analysis 0-1000 DSC (Standard Cell) unit. During testing, a nitrogen purge gas flow of 50 ml/min is used. Each sample is melt pressed into a thin film at 190° C.; the melted sample is then air-cooled to room temperature (25° C.). A 3-5 mg, 6 mm diameter specimen is extracted from the cooled polymer, weighed, placed in a light aluminum pan (50 mg), and crimped shut. The sample pan is placed in a DSC cell, and then heated, at a rate of approximately 10° C./min, to a temperature of 180° C. for PE (230° C. for polypropylene or "PP"). The sample is kept at this temperature for 1 minute in order to remove its thermal history. Then, the sample is cooled at a rate of 10° C./min to 0° C., and kept isothermally at that temperature for 3 minutes. The sample is next heated to 180° C. (this is the "second heat" ramp) at a rate of 10° C./min, until complete melting (second heat). The cooling and second heating curves are recorded.

Melting point, $T_m$, is determined from the DSC heating curve by first drawing the baseline between the start and end of the melting transition. A tangent line is then drawn to the data on the low temperature side of the melting peak. Where this line intersects the baseline is the extrapolated onset of melting ($T_m$). This is as described in Bernhard Wunderlich, *The Basis of Thermal Analysis*, in *Thermal Characterization of Polymeric Materials* 92, 277-278 (Edith A. Turi ed., 2d ed. 1997).

Horizontal Burn

The horizontal burn test is conducted in accordance with Method 1100.4 of UL-1581.

The test is performed by placing the coated wire in a horizontal position. A flame is set underneath it for a period of time, and then removed. Cotton is placed underneath the coated wire. The characteristics of the wire are then noted.

Where any specimen emits flaming or glowing particles, or flaming drops at any time that ignite the cotton (flameless charring of the cotton is to be ignored), the wire, cable, or assembly is to be judged capable of conveying flame to combustible materials in its vicinity. Where any specimen emits flaming or glowing particles, or flaming drops at any time that fall outside the area of the testing surface covered by the cotton and/or fall onto the wedge or burner, the test results are to be discarded and the test is to be repeated. For the repeat test, the cotton is to cover an area of the testing surface 305 mm wide by 355 mm deep, centered on the horizontal axis of the specimen and the specified cotton is to be clamped or otherwise secured to the wedge (no cotton under the wedge) and around the base of the burner. None of the cotton is to ignite in the repeat test, nor is the specimen to char for a total length greater than 100 mm. The time until the specimen self-extinguishes is recorded.

VW-1

The VW-1 flame test is determined in accordance with Method 1080 of UL-1581.

"VW-1" is an Underwriters' Laboratory (UL) flame rating for wire and sleeving. It denotes "Vertical Wire, Class 1," which is the highest flame rating a wire or sleeve can be given under the UL 1441 specification. The test is performed by placing a 508 mm wire or sleeve specimen in a vertical position. A "Bunsen" burner with a methane flame (a 500 watt flame) as specified by the ASTM 2556 standard is set underneath the wire or sleeve. The burner flame impinges the wire specimen at a 45° angle near the base of the sample. The specimen is ignited for a period of 15 seconds of flame exposure, and then the flame is removed (constituting 1 cycle). The characteristics of the sleeve are then noted. The time until the specimen self-extinguishes is recorded. A passing specimen self-extinguishes within 60 seconds of the removal of the burner, after each of 5 cycles of 15-second flame exposure and removal.

The test also features a cotton bed at the base of the test specimen to establish failure by flaming drip, and a flag on top of the specimen to show a propagation failure by flag burn. The "no char to flag length" is the distance between the bottom of the flag to the first point of damaged wire (indicating the length of wire remaining undamaged during the burn test).

By way of example, and not limitation, some embodiments of the present disclosure will now be described in detail in the following Examples.

EXAMPLES

The materials used in the examples are provided in Table 1 below.

TABLE 1

Materials

| Component | Specification | Source |
|---|---|---|
| DFDA-7530 NT (LLDPE) | linear low density polyethylene (LLDPE)  density = 0.921 g/cc    Tm = 205-220° C. | The Dow Chemical Company |
| AMPLIFY ™ EA 100 (EEA 100) | ethylene/ethyl acrylate (EEA) copolymer  density = 0.930 g/cc    Tm = 98.9° C.  melt index = 1.3 g/10 min | The Dow Chemical Company |
| SI-LINK ™ AC DFDB-5451 NT (DFDB-5451) | ethylene/silane reactor copolymer  density = 0.922 g/cc    Tm = 149-210° C.  hot creep = <100%    1.5 wt % silane | The Dow Chemical Company |
| SI-LINK ™ DFDA-5481 Natural (DFDA-5481 MB) | Catalyst Masterbatch containing a blend of 1-butene/ethene polymer, ethene homopolymer, a phenolic compound, dibutyltin dilaurate, and a phenolic hydrazide compound  density = 0.930 g/cc | The Dow Chemical Company |
| SI-LINK ™ AC DFDA-5488 NT (DFDA-5488 MB) | Catalyst Masterbatch containing a blend of a thermoplastic polymer, a phenolic compound, and a hydrophobic acid catalyst  density = 0.930 g/cc | The Dow Chemical Company |
| Z-6300 SILANE (VTMS) | hydrolyzable silane monomer    vinyltrimethylsilane ($C_5H_{12}Si$) | Dow Corning |
| SAYTEX ® 8010 | anhydride-free brominated flame retardant  ethane-1,2-bis(pentabromophenyl)    Mw = 971.2 g/mol | ALBEMARLE ® |
| | 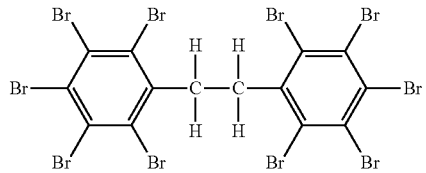 | |
| MICROFINE ® AO9 ($Sb_2O_3$) | antimony trioxide    Mw = 291.518 g/mol | Great Lakes Solution |
| Irganox ® 1010 | antioxidant  pentaerythritol tetrakis(3-(3,5-di-tert-butyl-4-hydroxyphenyl)propionate)  density = 1.15 g/cc    flashpoint = 297° C. | BASF |
| Luperox ® 101 | organic peroxide  2,5-bis(tert-butylperoxy)-2,5-dimethylhexane | Sigma-Aldrich |
| SABO ™ STAB UV-119 (HALS) | hindered amine light stabilizer    flash point = 278° C. | SABO S.p.A. |

A. Examples 1-7 and Comparative Samples 8-11

1. Examples 1-5 and Comparative Samples 8-9: With In Situ Si-g-PE

Examples 1-5 and Comparative Samples 8-9 are prepared by forming a flame retardant masterbatch containing AMPLIFY™ EA 100 (EEA copolymer), SAYTEX® BT-93W (anhydride-free brominated flame retardant), MICROFINE® AO9 (antimony trioxide), SABO™ STAB UV-119 (HALS), and Irganox® 1010 (antioxidant). The flame retardant masterbatch is formed to have the desired Sb:Br molar ratio (0.39-0.95 for Ex. 1-5, and less than 0.37 for CS 8-9). The flame retardant masterbatch is then weighed into a glass jar and combined with DFDA-7530 NT (LLDPE 2), Z-6300 SILANE (VTMS), Luperox® 101 (organic peroxide), and SI-LINK™ DFDA-5481 Natural (catalyst masterbatch to accelerate moisture crosslinking) to form a composition. The composition contains 50 wt % of the flame retardant masterbatch, based on the total weight of the composition. The amount of each component present in each final composition, prior to extrusion and crosslinking, is provided in Table 2 below. The Sb:Br molar ratio of the flame retardant masterbatch is the Sb:Br molar ratio of the final composition. The compositions are vacuum dried.

During extrusion of Ex. 1-5 and CS 8-9 (described below), the VTMS grafts onto the polymeric backbone of the LLDPE contained in each composition to form an in situ Si-g-PE.

2. Examples 6-7 and Comparative Samples 10-11: With Ethylene/Silane Reactor Copolymer Examples 6-7 and Comparative Samples 10-11 are prepared by forming a flame retardant masterbatch containing AMPLIFY™ EA 100 (EEA copolymer), SAYTEX® BT-93W (anhydride-free brominated flame retardant), MICROFINE® AO9 (antimony trioxide), SABO™ STAB UV-119 (HALS), and Irganox® 1010 (antioxidant). The flame retardant masterbatch is formed to have the desired Sb:Br molar ratio (0.52 for Ex. 6, 0.51 for Ex. 7, 0.22 for CS 10, and 0.33 for CS 11). The flame retardant masterbatch is then weighed into a glass jar and combined with SI-LINK™ AC DFDB-5451 NT (an ethylene/silane reactor copolymer) and a catalyst masterbatch to accelerate moisture crosslinking (SI-LINK™ DFDA-5481 Natural for Ex. 7, CS 10 and CS 11; SI-LINK™ AC DFDA-5488 NT for Ex. 6), to form a composition. The composition of Ex. 6 contains 10 wt % of the flame retardant masterbatch, based on the total weight of the composition. The composition of Ex. 7 contains 40 wt % of the flame retardant masterbatch, based on the total weight of the composition. The composition of CS 10 contains 25 wt % of the flame retardant masterbatch, based on the total weight of the composition. The composition of CS 11 contains 15 wt % of the flame retardant masterbatch, based on the total weight of the composition. The amount of each component present in each final composition, prior to extrusion and crosslinking, is provided in Table 2 below. The Sb:Br molar ratio of the flame retardant masterbatch is the Sb:Br molar ratio of the final composition. The compositions are vacuum dried.

3. Extrusion and Formation of a Coated Conductor

Each vacuum dried polymeric composition of Ex. 1-7 and CS 8-11 is individually placed in a 3-zone barrel, 25:1 L/D, ¾ inch (19.05 mm) Brabender™ extruder with a 0.050 inch (1.27 mm) tip and a 0.125 inch (3.175 mm) die, with a 3:1 compression ratio screw and a Maddox™ mixing head. A breaker plate and 40 mesh screen pack is used. Each vacuum dried sample is extruded with a screw speed of 40 rotations per minute (rpm) onto a bare copper conductor. The bare copper conductor is a 14 AWG (American Wire Gauge) single strand with a diameter of 0.064 inches (1.6256 mm). The zone temperatures are set at 150° C. for all zones including the die. The coating directly contacts the conductor to form a coated conductor.

Coated conductor samples are collected on a moving conveyor belt. The conveyor belt speed is set at ~8 feet per minute (2.4384 meters/min). The belt is adjusted to obtain a target coated conductor diameter of 0.124 inches (3.1496 mm), which results in a coating thickness of approximately 0.030 inches or 30 mils (0.762 mm). The coated conductor samples are immediately cooled in a water trough that resides 4-5 inches (10.16-12.7 cm) from the die. A minimum of 60 feet (18.288 meters) of coated wire is collected of each sample for further testing and evaluation. The coating on the tested coated conductor is moisture crosslinked.

The properties of the coated conductor samples and comparative coated conductor samples are provided in Table 2 below. The wt % of each component for the individual samples is provided as the amount of each component included in the extruder, prior to extrusion and crosslinking.

As shown, Ex. 1-5 and 7 each has a Sb:Br molar ratio from 0.39 to 0.95 and passes the VW-1 burn test. In contrast, each sample with a Sb:Br molar ratio less than 0.37 (CS 8-9 and 11) fails the VW-1 burn test.

Example 6, which has a Sb:Br molar ratio of 0.52 and contains a combined amount of 10 wt % anhydride-free brominated flame retardant and antimony trioxide, passes the horizontal burn test. Example 7, which has a Sb:Br molar ratio of 0.51 and contains a combined amount of 40 wt % anhydride-free brominated flame retardant and antimony trioxide, passes the horizontal burn test and the VW-1 burn test. In comparison, CS 11, which has a Sb:Br molar ratio of less than 0.37 (CS 11 has a Sb:Br molar ratio of 0.33) and contains a combined amount of 45 wt % anhydride-free brominated flame retardant and antimony trioxide, fails the VW-1 burn test. Furthermore, CS 10, which has a Sb:Br molar ratio of less than 0.37 (CS 15 has a Sb:Br molar ratio of 0.22), requires a combined amount of 15 wt % anhydride-free brominated flame retardant and antimony trioxide to pass the horizontal burn test (which is less stringent than the VW-1 burn test). Thus, coated conductors with a coating including a composition containing a silanol functionalized polyethylene and having a Sb:Br molar ratio of 0.37, or 0.39 to 0.95, or 1.05 are advantageously able to pass the horizontal burn test and/or the VW-1 burn test with low flame retardant loadings (10 wt %-40 wt %).

TABLE 2

|  | Ex. 1 | Ex. 2 | Ex. 3 | Ex. 4 | Ex. 5 | CS 8 |
|---|---|---|---|---|---|---|
| Et/Si■ DFDB-5451 wt % | — | — | — | — | — | — |
| LLDPE wt % | 44.40 | 44.40 | 44.40 | 44.40 | 44.40 | 44.40 |
| EEA 100 wt % | 9.969 | 9.969 | 9.969 | 9.969 | 9.969 | 9.969 |
| Brominated FR SAYTEX® 8010 wt % (Br in g†) | 16.47 (13.7035) | 20.95 (17.4323) | 22.61 (18.8104) | 24.00 (19.968) | 25.185 (20.954) | 26.205 (21.8041) |
| Sb₂O₃ wt % (Sb in g‡) | 23.53 (19.66) | 19.05 (5.91) | 17.39 (14.53) | 16.00 (13.37) | 14.815 (12.38) | 13.795 (11.52) |
| VTMS wt % | 1.50 | 1.50 | 1.50 | 1.50 | 1.50 | 1.50 |
| HALS wt % | 0.006 | 0.006 | 0.006 | 0.006 | 0.006 | 0.006 |
| Irganox® 1010 wt % | 0.025 | 0.025 | 0.025 | 0.025 | 0.025 | 0.025 |
| Luperox® 101 wt % | 0.10 | 0.10 | 0.10 | 0.10 | 0.10 | 0.10 |
| DFDA-5481 MB wt % | 4.00 | 4.00 | 4.00 | 4.00 | 4.00 | 4.00 |
| DFDA-5488 MB wt % | — | — | — | — | — | — |
| Total wt % | 100 | 100 | 100 | 100 | 100 | 100 |
| Sb:Br Molar Ratio | 0.95 | 0.61 | 0.51 | 0.44 | 0.39 | 0.35 |
| Weight Ratio FR:Sb₂O₃◊ | 0.7:1.0 | 1.1:1.0 | 1.3:1.0 | 1.5:1.0 | 1.7:1.0 | 1.9:1.0 |
| VW-1 Time to Self-Extinguish (sec) Cycle 1 | 0 | 0 | 0 | 0 | 0 | 0 |
| Cycle 2 | 0 | 0 | 1 | 1 | 0 | 1 |
| Cycle 3 | 30 | 3 | 17 | 16 | 49 | >60 |
| Cycle 4 | 0 | 2 | 1 | 5 | 2 | — |
| Cycle 5 | 0 | 0 | 0 | 0 | 2 | — |
| VW-1 Flag Burn# | no | no | no | no | no | BF |
| VW-1 Pass or Fail# | Pass | Pass | Pass | Pass | Pass | Fail |
| VW-1 No Char to Flag (mm) | 42 | 135 | 110 | 127 | 46 | 0 |
| Hot Creep (%) at 50.8 cm/min and 200° C. | 2.1 | 5.7 | 8.1 | 3.5 | 4.3 | 5.1 |
| Horizontal Burn Time to Self-Extinguish (sec) |  |  |  |  |  |  |
| Horizontal Burn Total Char (mm) |  |  |  |  |  |  |
| Horizontal Burn Pass or Fail* |  |  |  |  |  |  |

|  | CS 9 | Ex. 6 | Ex. 7 | CS 10 | CS 11 |
|---|---|---|---|---|---|
| Et/Si■ DFDB-5451 wt % | — | 82.50 | 46.00 | 70.00 | 20.00 |
| LLDPE wt % | 44.40 | — | — | — | — |
| EEA 100 wt % | 9.969 | 2.49225 | 9.969 | 9.9845 | 29.9535 |
| Brominated FR | 27.095 | 5.625 | 22.61 | 11.25 | 33.75 |

TABLE 2-continued

| | | | | | | |
|---|---|---|---|---|---|---|
| SAYTEX ® 8010 wt % (Br in g[†]) | | (22.5445) | (4.63) | (18.8104) | (9.26) | (27.7763) |
| $Sb_2O_3$ wt % (Sb in g[‡]) | | 12.905 (10.78) | 4.375 (3.65) | 17.39 (14.53) | 3.75 (3.13) | 11.25 (9.3976) |
| VTMS wt % | | 1.50 | — | — | — | — |
| HALS wt % | | 0.006 | 0.0015 | 0.006 | 0.003 | 0.009 |
| Irganox ® 1010 wt % | | 0.025 | 0.00625 | 0.025 | 0.0125 | 0.0375 |
| Luperox ® 101 wt % | | 0.10 | — | — | — | — |
| DFDA-5481 MB wt % | | 4.00 | — | 4.00 | 5.00 | 5.00 |
| DFDA-5488 MB wt % | | — | 5.00 | — | — | — |
| Total wt % | | 100 | 100 | 100 | 100 | 100 |
| Sb:Br Molar Ratio | | 0.32 | 0.52 | 0.51 | 0.22 | 0.33 |
| Weight Ratio FR:$Sb_2O_3$[◊] | | 2.1:1 | 1.3:1.0 | 1.3:1.0 | 3.0:1.0 | 3.0:1.0 |
| VW-1 Time to Self-Extinguish (sec) | Cycle 1 | 0 | | 0 | | 0 |
| | Cycle 2 | >60 | | 0 | | 0 |
| | Cycle 3 | — | | 9.7 | | 33.4 |
| | Cycle 4 | — | | 1.3 | | 0 |
| | Cycle 5 | — | | 0 | | 0 |
| VW-1 Flag Burn[#] | | BF | | no | | BF |
| VW-1 Pass or Fail[#] | | Fail | | Pass | | Fail |
| VW-1 No Char to Flag (mm) | | 0 | | 154 | | 0 |
| Hot Creep (%) at 50.8 cm/min and 200° C. | | 4.9 | | | | |
| Horizontal Burn Time to Self-Extinguish (sec) | | | 28 | | 44 | |
| Horizontal Burn Total Char (mm) | | | 48 | | 63 | |
| Horizontal Burn Pass or Fail* | | | Pass | Pass | Pass | |

CS = Comparative Sample
■Et/si = ethylene/silane copolymer
[†]Br in g = the amount in grams of bromine (Br)
[#]VW-1 passing requires that a sample self-extinguish within 60 seconds (≤60 sec) of the removal of a burner for each of 5 cycles and exhibit no flag burn (BF).
*Horizontal Burn is tested in accordance with UL-1581. Passing requires that a sample self-extinguish within 80 seconds (≤80 sec) and exhibit a total char of 100 mm or less (≤100 mm).
wt % of each component for the individual samples is provided as the amount of each component included in the extruder, prior to extrusion and crosslinking
[◊] The weight ratio of FR:$Sb_2O_3$ is calculated using the weight of the flame retardant (FR) included in the composition
[‡]Sb in g = the amount in grams of antimony (Sb)

Ex. 7 is tested for wet insulation resistance (IR). The wet insulation resistance of Ex. 7 is provided in Table 3 below.

TABLE 3

| Weeks | Days | Ex. 7 Wet IR @ 75° C. (Mohm/1000 feet) | Ex. 7 Wet IR @ 90° C. (Mohm/1000 feet) |
|---|---|---|---|
| 0 | 0 | 63,100,000 | 15,990,000 |
| 1 | 7 | 58,300,000 | 15,750,000 |
| 2 | 14 | 51,100,000 | 17,010,000 |
| 4 | 28 | 47,300,000 | 16,470,000 |
| 5 | 35 | 45,800,000 | 22,700,000 |
| 6 | 42 | 46,000,000 | 21,500,000 |
| 7 | 49 | 44,600,000 | 35,000,000 |
| 8 | 56 | 43,000,000 | 41,800,000 |
| 10 | 70 | 43,800,000 | 67,900,000 |
| 11 | 77 | 44,100,000 | 63,700,000 |
| 13 | 91 | 43,400,000 | 93,200,000 |
| 14 | 98 | 45,800,000 | 78,600,000 |
| 15 | 105 | 47,400,000 | 69,100,000 |
| 16 | 112 | 48,000,000 | 86,400,000 |
| 17 | 119 | 46,700,000 | 59,500,000 |
| 18 | 126 | 47,000,000 | 77,400,000 |
| 19 | 133 | 44,400,000 | 62,800,000 |
| 20 | 140 | 41,000,000 | 92,100,000 |
| 21 | 147 | 44,800,000 | 83,400,000 |
| 22 | 154 | 48,200,000 | 86,200,000 |
| 23 | 161 | 45,800,000 | 57,300,000 |
| 24 | 168 | 45,500,000 | 53,900,000 |
| 25 | 175 | 45,500,000 | 53,900,000 |

It is specifically intended that the present disclosure not be limited to the embodiments and illustrations contained herein, but include modified forms of those embodiments including portions of the embodiments and combinations of elements of different embodiments as come within the scope of the following claims.

We claim:

1. A composition comprising:
   a silanol functionalized polyolefin;
   an anhydride-free brominated flame retardant;
   antimony trioxide; and
   the composition has an antimony (Sb) to bromine (Br) molar ratio (Sb:Br molar ratio) from 0.37 to 1.05.

2. The composition of claim 1, wherein the Sb:Br molar ratio is from 0.44 to 0.95 and the combined amount of anhydride-free brominated flame retardant and antimony trioxide is from 1 wt % to 40 wt % of the total composition.

3. The composition of claim 1 comprising a second polyolefin.

4. The composition of claim 1, wherein the anhydride-free brominated flame retardant is selected from the group consisting of decabromodiphenyl ether, ethylene bis-tetrabromophthalimide, ethane-1,2-bis(pentabromophenyl), n,n'-bis(tetrabromalophthalimide), brominated polystyrene, poly(4-bromostyrene), poly(bromostyrene), brominated natural rubber, brominated synthetic rubber, polyvinyl bromide, poly(vinylidene bromide), poly(2-bromoethyl methacrylate), poly(2,3-dibromopropyl methacrylate), poly(methyl-α-bromoacrylate), butadiene styrene brominated copolymer, and combinations thereof.

5. The composition of claim 1 comprising:
   from 40 wt % to 65 wt % of the silanol functionalized polyolefin;
   from 15 wt % to 25 wt % of the anhydride-free brominated flame retardant;

from 10 wt % to 20 wt % of the antimony trioxide;
from 1 wt % to 15 wt % of an ethylene/ethyl acrylate copolymer; and
the composition has a Sb:Br molar ratio from 0.47 to 0.55.

6. The composition of claim 1 comprising:
from 30 wt % to 60 wt % of the silanol functionalized polyolefin;
from 10 wt % to 30 wt % of the anhydride-free brominated flame retardant;
from 10 wt % to 30 wt % of the antimony trioxide;
from 5 wt % to 20 wt % of an ethylene/ethyl acrylate copolymer; and
the composition has a Sb:Br molar ratio from 0.39 to 0.95.

7. The composition of claim 1 comprising:
from 60 wt % to 97 wt % of the silanol functionalized polyolefin;
from 1 wt % to 10 wt % of the anhydride-free brominated flame retardant;
from 1 wt % to 10 wt % of the antimony trioxide;
from 1 wt % to 15 wt % of an ethylene/ethyl acrylate copolymer; and
the composition has a Sb:Br molar ratio from 0.50 to 0.60.

8. A coated conductor comprising:
a conductor and
a coating on the conductor, the coating comprising a composition comprising:
  a silanol functionalized polyolefin;
  an anhydride-free brominated flame retardant;
  antimony trioxide; and
  the composition has an antimony (Sb) to bromine (Br) molar ratio (Sb:Br molar ratio) from 0.37 to 1.05.

9. The coated conductor of claim 8, wherein the Sb:Br molar ratio is from 0.39 to 0.95 and the combined amount of anhydride-free brominated flame retardant and antimony trioxide is from 1 wt % to 40 wt % of the total composition.

10. The coated conductor of claim 8 wherein the composition comprises a second polyolefin.

11. The coated conductor of claim 8, wherein the anhydride-free brominated flame retardant is selected from the group consisting of decabromodiphenyl ether, ethylene bis-tetrabromophthalimide, ethane-1,2-bis(pentabromophenyl), n,n'-bis(tetrabromalophthalimide), brominated polystyrene, poly(4-bromostyrene), poly(bromostyrene), brominated natural rubber, brominated synthetic rubber, polyvinyl bromide, poly(vinylidene bromide), poly(2-bromoethyl methacrylate), poly(2,3-dibromopropyl methacrylate), poly(methyl-α-bromoacrylate), butadiene styrene brominated copolymer, and combinations thereof.

12. The coated conductor of claim 8, wherein the composition comprises:
from 40 wt % to 65 wt % of the silanol functionalized polyolefin;
from 15 wt % to 25 wt % of the anhydride-free brominated flame retardant;
from 10 wt % to 20 wt % of the antimony trioxide;
from 1 wt % to 15 wt % of an ethylene/ethyl acrylate copolymer; and
the composition has a Sb:Br molar ratio from 0.47 to 0.55; and the coated conductor passes the VW-1 test.

13. The coated conductor of claim 8, wherein the composition comprises:
from 30 wt % to 60 wt % of the silanol functionalized polyolefin;
from 10 wt % to 30 wt % of the anhydride-free brominated flame retardant;
from 10 wt % to 30 wt % of the antimony trioxide;
from 5 wt % to 20 wt % of an ethylene/ethyl acrylate copolymer; and
the composition has a Sb:Br molar ratio from 0.37 to 0.95; and the coated conductor passes the VW-1 test.

14. The coated conductor of claim 8, wherein the composition comprises:
from 60 wt % to 97 wt % of the silanol functionalized polyolefin;
from 1 wt % to 10 wt % of the anhydride-free brominated flame retardant;
from 1 wt % to 10 wt % of the antimony trioxide;
from 1 wt % to 15 wt % of an ethylene/ethyl acrylate copolymer;
the composition has a Sb:Br molar ratio from 0.50 to 0.60; and
the coated conductor passes the horizontal burn test.

15. The coated conductor of claim 8, wherein the anhydride-free brominated flame retardant is a single halogenated flame retardant.

* * * * *